(12) United States Patent
Pope et al.

(10) Patent No.: US 8,601,115 B2
(45) Date of Patent: Dec. 3, 2013

(54) PROVIDING STATE INFORMATION AND REMOTE COMMAND EXECUTION IN A MANAGED MEDIA DEVICE

(75) Inventors: Nick George Pope, Suwanee, GA (US); Theodore R. Grevers, Jr., Milford, MA (US); Brian Alan Davis, Medford, MA (US); Christopher Adam Maloney, Jamesburg, NJ (US)

(73) Assignee: Cisco Technology, Inc., San Jose, CA (US)

( * ) Notice: Subject to any disclaimer, the term of this patent is extended or adjusted under 35 U.S.C. 154(b) by 299 days.

(21) Appl. No.: 12/824,173

(22) Filed: Jun. 26, 2010

(65) Prior Publication Data

US 2011/0320585 A1    Dec. 29, 2011

(51) Int. Cl.
*G06F 15/173* (2006.01)
(52) U.S. Cl.
USPC ............... 709/224; 709/203; 709/225; 726/6
(58) Field of Classification Search
USPC ................ 709/203, 223–225; 726/2, 5, 6
See application file for complete search history.

(56) References Cited

U.S. PATENT DOCUMENTS

| | | | | |
|---|---|---|---|---|
| 7,203,730 B1* | 4/2007 | Meyer et al. | ............... | 709/213 |
| 7,260,632 B2* | 8/2007 | Shaffer et al. | ............... | 709/224 |
| 2002/0112046 A1* | 8/2002 | Kushwaha et al. | ............ | 709/223 |
| 2003/0073440 A1* | 4/2003 | Mukherjee et al. | ............ | 455/435 |
| 2004/0006611 A1* | 1/2004 | Yi | ............... | 709/222 |
| 2006/0280166 A1* | 12/2006 | Morris | ............... | 370/352 |
| 2007/0041542 A1* | 2/2007 | Schramm et al. | ......... | 379/142.07 |
| 2008/0244077 A1* | 10/2008 | Canosa | ............... | 709/227 |
| 2008/0256200 A1* | 10/2008 | Elliston | ............... | 709/206 |
| 2009/0193132 A1* | 7/2009 | Plewnia | ............... | 709/230 |
| 2009/0249454 A1* | 10/2009 | Yamamoto et al. | ............... | 726/5 |
| 2009/0254627 A1* | 10/2009 | Morris | ............... | 709/206 |
| 2009/0254648 A1* | 10/2009 | Childress et al. | ............... | 709/223 |
| 2009/0319598 A1* | 12/2009 | Mittel et al. | ............... | 709/202 |
| 2010/0088371 A1* | 4/2010 | Xu et al. | ............... | 709/203 |
| 2010/0118771 A1* | 5/2010 | Lee et al. | ............... | 370/328 |
| 2010/0210240 A1* | 8/2010 | Mahaffey et al. | ............... | 455/411 |
| 2010/0217837 A1* | 8/2010 | Ansari et al. | ............... | 709/218 |
| 2010/0220687 A1* | 9/2010 | Reznik et al. | ............... | 370/331 |
| 2010/0223328 A1* | 9/2010 | Haataja et al. | ............... | 709/203 |
| 2010/0279652 A1* | 11/2010 | Sharp et al. | ............... | 455/410 |
| 2011/0125898 A1* | 5/2011 | Hassan et al. | ............... | 709/225 |
| 2011/0161394 A1* | 6/2011 | Chidel et al. | ............... | 709/203 |
| 2011/0173324 A1* | 7/2011 | Wang et al. | ............... | 709/225 |
| 2012/0158943 A1* | 6/2012 | Esteve Balducci et al. | ... | 709/224 |

* cited by examiner

*Primary Examiner* — Oanh Duong
(74) *Attorney, Agent, or Firm* — Meunier Carlin & Curfman, LLC (57) ABSTRACT

Systems and methods for providing state information and remote command execution using Extensible Messaging and Presence Protocol (XMPP), Session Initiation Protocol (SIP) or any other protocol that provides for authentication, presence and messaging. A device may exist within a managed or unmanaged network and sign on to a managed network and provide presence information augmented with state information to provide near real-time state information to the managed network. The network may also discover remote command support in endpoint devices to command and control the devices remotely, while traversing unmanaged networks and components.

10 Claims, 6 Drawing Sheets

PROVIDING STATE INFORMATION AND REMOTE COMMAND EXECUTION IN A MANAGED MEDIA DEVICE

BACKGROUND

In deployments of embedded devices, such as set tops, trend reports are a tool that is used to track the stability of new code releases and to identify patterns on many other service, network device trends. Typically, these trend reports are generated by polling devices, querying specific information, and generating reports that highlight trends. However, there are a few challenges with this method in that many consumer devices are behind a Network Address Translation (NAT)/Firewall gateway, thus it is difficult to poll without specific support in the gateway. In addition, polling a large population (millions) of devices takes a very long time and can present an undesirable load on the access network, the back-end systems, and the devices themselves, especially if no new information is available.

In some architectures, it is very difficult to manage devices that are connected to the network through a NAT/Firewall gateway. Consumer level NAT/Firewall gateway devices are typically not managed by the service provider, and therefore cannot be configured by the service provider to allow common management protocols, e.g., HTTP, SNMP, SSH, through the NAT/Firewall gateway to reach the digital media device. Due to these difficulties, in many architectures, the service provider does not manage devices behind unmanaged NAT/Firewall gateways or on unmanaged networks (like the Internet).

SUMMARY

Systems, devices, and methods for providing state information and remote command execution using Extensible Messaging and Presence Protocol (XMPP), Session Initiation Protocol (SIP) or any other protocol that provides for authentication, presence and messaging. One such method is performed in a digital media device, such as a set top box.

In accordance with some implementations, there is provided a method of providing real-time or near real-time state information to a network. The method may include monitoring state information in a media device, authenticating the media device, ascertaining the state information of the media device, and communicating presence information together with the state information to the network as part of an authentication process.

In accordance with some implementations, there is provided a method of executing a remote command on a media device in a network. The method may include discovering commands supported by the media device, receiving a list of supported commands, sending a remote command to the media device for execution, and receiving a status message from the media device.

This summary is provided to introduce a selection of concepts in a simplified form that are further described below in the detailed description. This summary is not intended to identify key features or essential features of the claimed subject matter, nor is it intended to be used to limit the scope of the claimed subject matter.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure.

DETAILED DESCRIPTION

Implementations are disclosed herein that provide systems, devices, and methods for providing state information and remote command execution using Extensible Messaging and Presence Protocol (XMPP), Session Initiation Protocol (SIP) or any other protocol that provides for authentication, presence and messaging. One such method is performed in a digital media device, such as a set top box.

Figure 1:
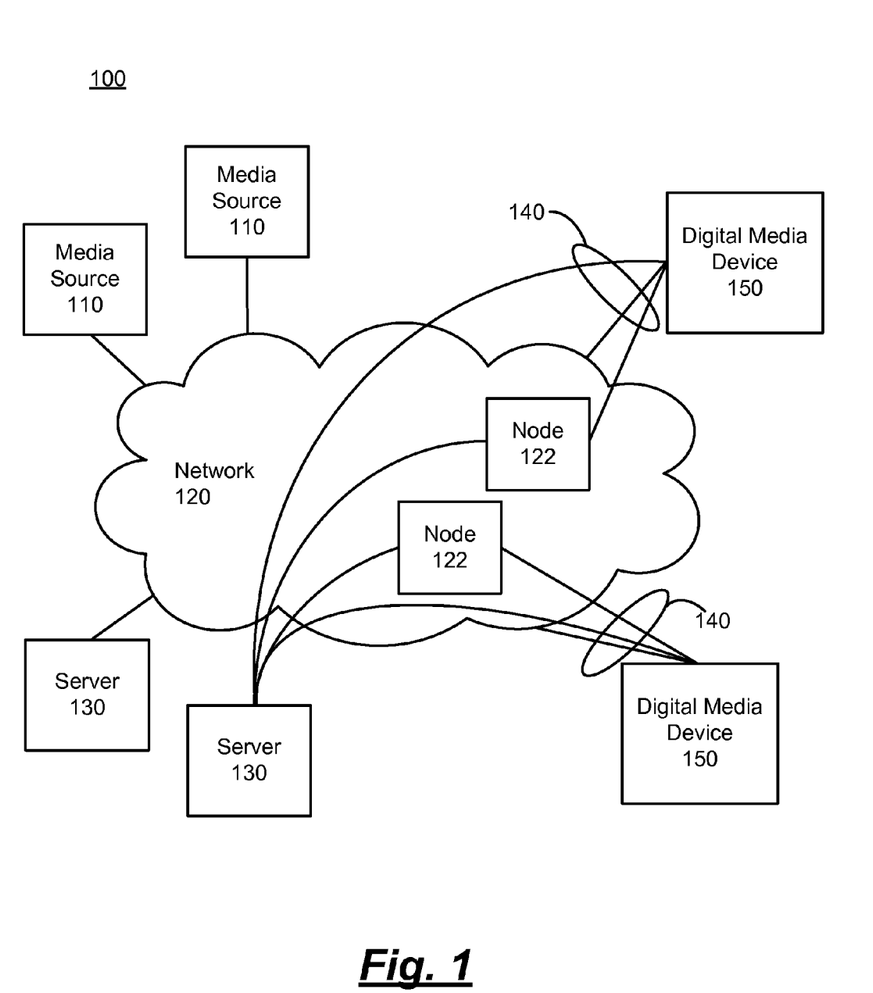
FIG. 1 is a block diagram of an environment in which implementations of the present disclosure may be provided.

FIG. 1 is a block diagram of an environment in which implementations of the present disclosure may be provided. The system 100 may deliver various digital television, data, voice and video services to subscribers, which may include television programming, video-on-demand, pay-per-view, music, Internet access, applications, shopping, and telephone. The television services may be provided from various sources, such as a media source 110, which provides or transmits encoded media content in, for instance, a cable television network, a television services network, or originally from a broadcast television station. Other sources of media content or television services should be familiar to a person of ordinary skill in the art, and are intended to be within the scope of this disclosure.

Various media content sources may be located at a facility known as a "headend" which is operated by a television services provider (e.g., a network operator) that also may operate a network 120. The media source 110 may be part of the network 120. However, these components are not limited to residing at that location. The media content or video programs of television services, from various sources, are provided over network 120 to a digital media device(s) 150, which may include set top boxes, media center devices, personal computers (e.g., WINDOWS, MAC and/or Linux) mobile connected devices, etc.

In general, a content provider (not shown) provides content to one or more headends, which in turn communicate one or more hubs, nodes and taps in the network 120. In one example, fiber optic cable may be used to transmit optical signals from the hubs to the nodes. The optical signal may be converted to an RF signal at the node and transmitted to the tap and ultimately to the digital media device 150 by coaxial cable.

In some implementations, the network 120 may be an ATM or Ethernet network that includes an access node. The access node may connect to a residential gateway at a subscriber's premises. The residential gateway may be managed or unmanaged. One or more digital media receiver(s) 150 within the premises may be connected to the residential gateway via an IP connection to provide digital television, data and voice services. The network 120 may be an IP network that handles all types of traffic (video, data, voice, etc.). Quality of service (QoS) tools can prioritize the video traffic to prevent delay or fragmentation of the signal.

Common encoding and/or container formats for the content transported in the network 120 may include MPEG-2 video, H.264, MP4, or SMPTE VC-1, but others are contemplated to be within the scope of this disclosure.

In some implementations, network content (e.g., the Internet) may be provided to the digital media device 150. The content may be accessed at a server identified by a Uniform Resource Locator (URL) or Internet Protocol (IP) address, and downloaded from a network location to the digital media device 150. The content may be any type of data, including, but not limited to, multimedia content, audio, applications, interactive content, Web content, etc. The content may be made available by a service provider of the network 120 or from other sources.

The digital media device 150 receives, via the subscriber connection 140, the subset of video programs and services to which the subscriber subscribes. The digital media device 150 may select one or more of the delivered television services for presentation to a user (e.g., by "tuning" to a program). In some implementations, the digital media device 150 processes the one or more multiplexed media streams corresponding to the video program of the selected television service and converts them into a presentable or output form, such as a video signal, either in analog form or digital form. Processing may comprise decompression and reconstruction of the pictures in a received video stream. This video signal is supplied to a display (e.g., a television or computer monitor) for viewing by a subscriber. In some implementations, the digital media device 150 stores the video program of the selected television service for later presentation (e.g., digital video recorder or DVR).

In some implementations, the digital media device 150 may access and receive network content from, e.g., the Internet or other network location. As noted above, the network content may be any type of data. The data may be downloaded by a subscriber using the digital media device 150, or may be provided to the digital media device 150 by a service provider.

In some implementations, the digital media device 150 publishes certain items of information to a "publish-subscribe" (PubSub) node or Personal Event Protocol (PEP) node 122 via the subscriber connection 140. The node 122 may be an entity defined by XEP-0271: XMPP Nodes (published by the XMPP Standards Foundation), which identifies a particular facet or aspect of an XMPP domain, localpart, or resource. The node 122 may implement aspects of a "publish-subscribe" (PubSub) model where a person or application publishes information, and an event notification (with or without payload) is broadcasted to all authorized subscribers.

In general, the relationship between the publisher and subscriber may be mediated by a service that receives publication requests, broadcasts event notifications to subscribers, and enables privileged entities to manage lists of people or applications that are authorized to publish or subscribe. The focal point for publication and subscription is a "node" (i.e., node 122) to which publishers send data and from which subscribers receive notifications. Nodes can also maintain a history of events and provide other services.

The nodes 122 may be organized in a hierarchical (tree structure) and be one of two types. Leaf nodes are nodes that contain published items. Collection nodes are nodes that contain other nodes. Thus, when a user subscribes to the node 122, that node may be a leaf node where notifications are sent when new items are published to the node. Otherwise, the node 122 is a collection node, and notifications are made on addition/removal of child nodes or when new items are published to child nodes.

In other implementations, the digital media device 150 may subscribe to publications from the node 122. In such implementations, when information is published by the node 122, the digital media device 150 may receive notifications of new/update information via the subscriber connection 140.

A server 130 may provide messaging, presence, XML routing features, content, applications, data, etc. In some implementations, the server 130 may provide multimedia to the digital media device 150 for viewing by a subscriber. For example, the server 130 may be operated by a service that provides on-demand access to multimedia content. In some implementations, the server 130 may be located on the managed or unmanaged network and may be a Web server, FTP server, etc., that serves content, applications, data, etc. to the digital media device 150.

In some implementations, the server 130 may be a subscriber or publisher in a PubSub service. In other implementations, the server 130 may be a diagnostic component that initiates a command session with, e.g., the digital media device 150 to perform maintenance. In yet other implementations, the server 130 may be a storage component that stores private and/or public information, such as a configuration of the digital media device 150. In some implementations, the server 130 may use XMPP, SIP, or any other protocol that provides for authentication, presence and messaging.

In some implementations, the server 130 may be an aggregator or a harvester. The aggregator may be a device that receives raw media events from a PEP node 122 that subscribes to a digital media device 150. The aggregator may store and send the raw events to the harvester, or send the raw media events to the harvester as they are received from the digital media device(s) 150. The harvester may also pull the raw media events from the aggregator. The harvester reformats the raw media events to remove some data; or other data might be changed to protect the identity of the service provider's subscribers. In some implementations, the harvester may change the data from one XML format to another XML format. The harvester may then send the reformatted data to one or more analysis systems, or alternatively, the analysis systems may pull in the information from the harvester. The relationships of harvesters to aggregators to PEP nodes may be changed to scale up or scale down the numbers of servers 130 needed to collect the raw media events in a service providers' system. Thus, aggregators and harvesters may be added and subtracted, as needed. Further, the connectivities between the aggregators and harvesters may also be altered, as needed.

While the subscriber connection 140 is shown as plural connections to the network 120, the node 122 and the server 130, it is noted that the subscriber connection 140 may be one physical connection, such as a coaxial cable, Ethernet, fiber optic, or other physical media.

Figure 2:
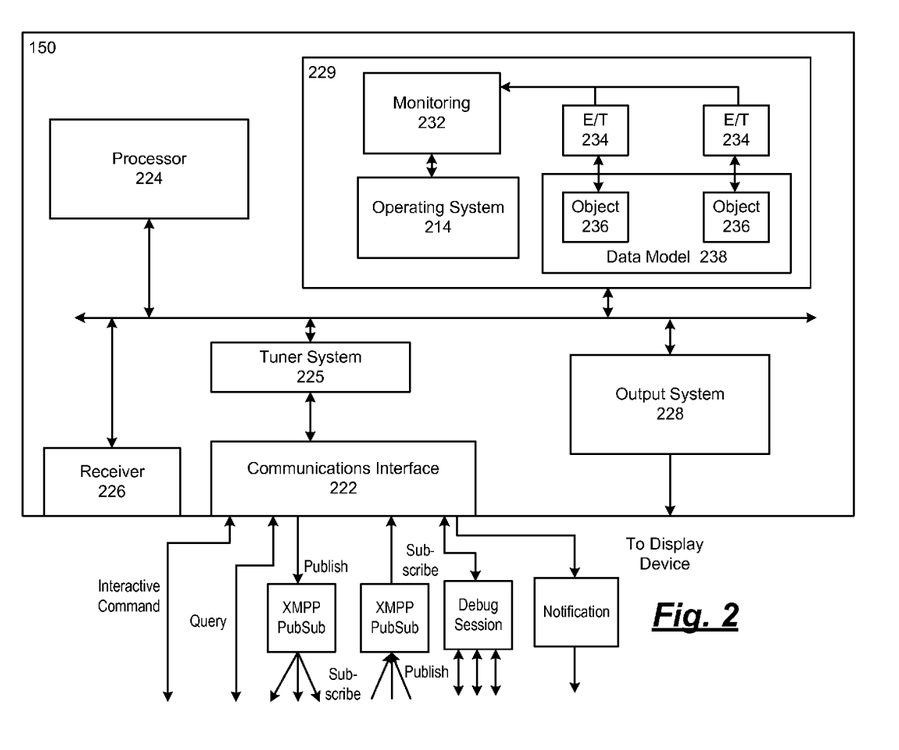
FIG. 2 is a block diagram depicting a non-limiting example of the digital media device.

FIG. 2 is a block diagram depicting a non-limiting example of the digital media device 150. The digital media device 150 described herein is merely illustrative and should not be construed as implying any limitations upon the scope of the present invention. The digital media device 150 preferably includes a communications interface 222 for receiving signals (video, audio and/or data) from the headend within the network 120.

The digital media device 150 further includes at least one processor 224 for controlling operations of the digital media device 150, an output system 228 for driving a display device, and a tuner system 225 for tuning to a particular television channel to be displayed and for sending and receiving various types of data or media to/from the headend. The tuner system 225 includes, in one implementation, an out-of-band tuner for bi-directional Quadrature phase shift keying (QPSK) data communication and a Quadrature amplitude modulation (QAM) tuner for receiving television signals. Additionally, a receiver 226 receives externally-generated user inputs or commands from an input device such as, for example, a remote control device.

The processor 224 may provide for functions such as decoding, transcoding/encoding (converting from one format to another) and transrating (scaling from a higher to a lower bit rate) of various media streams, as well as having the ability to accommodate system-level functions such as decryption, encryption, packetization and transport of media streams. Besides broadcast content, the digital media device 150 may support content received from a home network or the Internet.

The communications interface 222 of the digital media device 150 may also include one or more wireless or wired interfaces (not shown), also called ports, for receiving and/or transmitting data to other devices. For instance, the digital media device 150 may feature a USB (Universal Serial Bus), an Ethernet port (for connection to a computer or network), an IEEE-1394 connection (for connecting to consumer electronics equipment), eSATA port (external Serial Advanced Technology Attachment for attachment of mass storage devices), and a serial port. Wireless interfaces include, but are not limited to, 802.11 (WiFi) 806.16 (WiMax), Bluetooth, Zigee, cellular, etc. User inputs may, for example, be provided via a computer, via buttons or keys located on the exterior of the digital media device 150, via a hand-held remote control device, and/or via a keyboard that includes user-actuated buttons, etc.

In one implementation, a system memory 229 may be provided within which various applications, modules and data may be stored for execution and use by the processor 224. Basic functionality of the digital media device 150 is provided by an operating system 214 that coordinates the resources of the digital media device 150 such as, for example, computing resources. One or more applications, may be executed by utilizing the computing resources in the digital media device 150. Applications stored in the system memory 229 are executed by processor 224 (e.g., a central processing unit or digital signal processor) under the auspices of the operating system 214.

Data required as input by an application is stored in the system memory 229, and read by processor 224 as need be during the course of the application's execution. Input data may be data stored in system memory 229 by a secondary application or other source, either internal or external to the digital media device 150, or possibly anticipated by the application and thus created with the application at the time it was generated as a software application. Data generated by an application is stored in system memory 229 by the processor 224 during the course of the application's execution.

In some implementations, the digital media device 150 may implement a monitoring agent 232 that interfaces with the operating system 214 and monitors one or more event/ triggers 234. The monitoring agent 232 may monitor media events, diagnostic events, or other events within the digital media device 150. The event/triggers 234 respond to a defined set of expressions to set triggers on objects 236 within a data model 238. When a trigger is tripped, one or more events occur. Events may be actions, such as starting logging, generating notifications, performing a core dump, etc. Notifications may be small messages that are communicated over the network 120 to various recipients by the monitoring agent 232.

In accordance with some implementations, the communications interface 222 may be configured to provide for communications using various extensions of XMPP. XMPP is an XML-based protocol that provides messaging and presence information. XMPP operates behind a router and passes through network access translation (NAT) gateway devices. Thus, if the client is behind a NAT and/or Firewall gateway, in e.g., in a home, XMPP can be used to traverse the router to enable communications between the client and server. The extensions may be implemented to provide various capabilities to the digital media device 150. For example, the digital media device 150 may subscribe to events (e.g., geographically relevant events) or publish information about the digital media device 150 for collection (e.g., usage and behavior information). The digital media device 150 may be remotely commanded, queried or debugged by, e.g., the server 130 to perform diagnostic operations, report health and status, and to track state information. The digital media device 150 may report state information to the server 130. The digital media device 150 may also save information to the XMPP core network or and/or synchronize with another digital media device 150. Other features may be implemented in accordance with the XMPP extensions.

Figure 3:
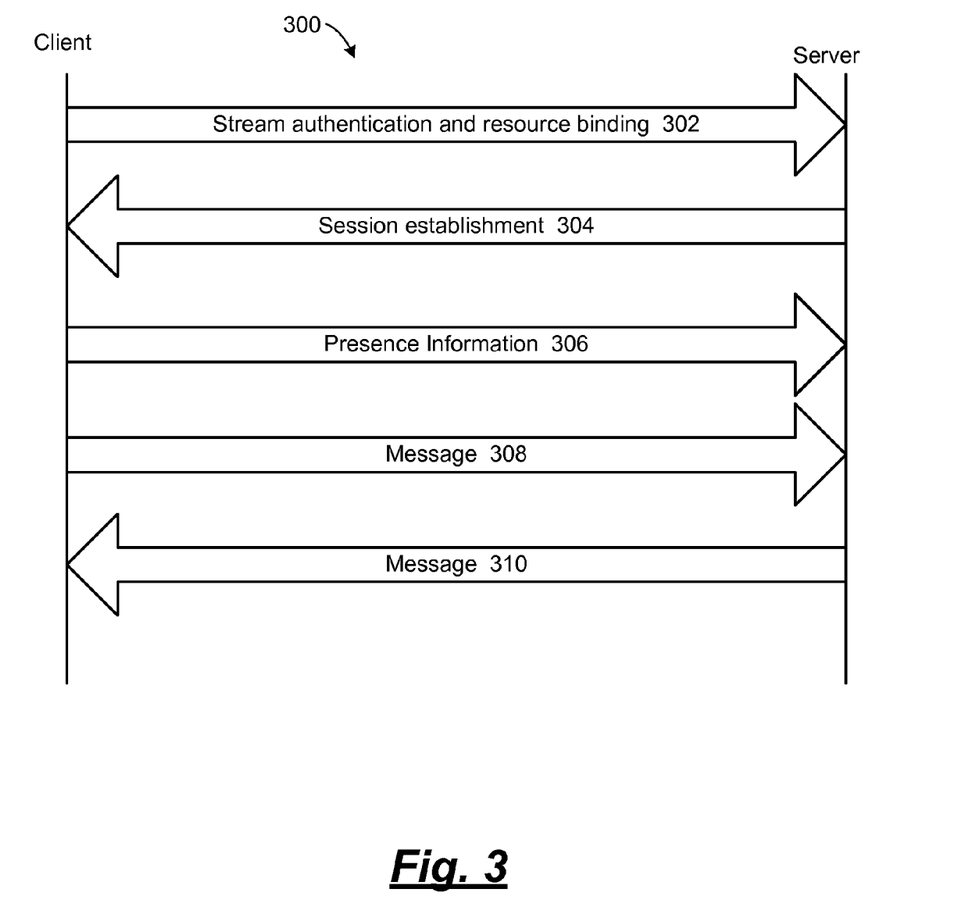
FIG. 3 is a diagram illustrating aspects of message flows between a client device and a server.

FIG. 3 is a diagram illustrating aspects of message flows 300 between a client (e.g., the digital media device 150) and a server (e.g., server 130). In some implementations the client and server communicate based on RFC 3920 (Extensible Messaging and Presence Protocol (XMPP): Core) and RFC 3921 (Extensible Messaging and Presence Protocol (XMPP): Instant Messaging and Presence). A client's session with a server may be viewed as XML streams and XML stanzas. The XML stream acts as an envelope for all the XML stanzas sent during a session. This may be represented as:

```
<stream>
  <presence>
    <show/>
  </presence>
  <message to='foo'>
    <body/>
  </message>
  <iq to='bar'>
    <query/>
  </iq>
  ...
</stream>
```

The attributes of the stream element are 'to,' which is used from initiating entity to the receiving entity. The 'from' attribute is used by the receiving entity to the initiating entity. the 'id' attribute is from the receiving entity to the initiating entity and is a unique identifier created by the receiving entity to function as a session key for the initiating entity's streams with the receiving entity. An 'xml:lang' attribute specifies the default language of any human-readable XML character data sent over that stream. The 'version' attribute is set to a value of at least "1.0" and signals support for the stream-related protocols.

In FIG. 3, a first message 302 from the client (e.g., digital media device 150) to the server (e.g., Server 130) may include a stream authentication to establish a session or send XML stanzas. XMPP includes a method for authenticating a stream by means of an XMPP-specific profile of the Simple Authentication and Security Layer (SASL) protocol. After completing stream authentication, a reply 304 from the server may be indicative of resource binding. A client binds a resource to the stream, such that the client's address may be of the form <user@domain/resource>, after which the entity is now said to be a "connected resource."

After establishing a session, a client may send initial presence information 306 to the server in order to signal its availability for communications. The initial presence stanza includes the 'to' address to signal that it is meant to be broadcasted by the server on behalf of the client. After sending initial presence, an active resource is said to be an "available resource." In accordance with some implementations, the initial (or subsequent) presence information may include status information, such as, version, reboot reason, on, off, standby, rebooting, upgrading software, just crashed, etc.

Upon receiving initial presence from a client, the server may send presence probes (i.e., presence stanzas whose 'type' attribute is set to a value of "probe") of the user (client) to all contacts to which the user is subscribed in order to determine if they are available. The server may also broadcast initial presence of the user to all contacts that are subscribed to the user's presence information. After sending initial presence, the client may update its presence information for broadcasting at any time during its session. The client and server may then exchange messages 308, 310 regarding subscriptions, rosters, statuses, etc.

Figure 4:
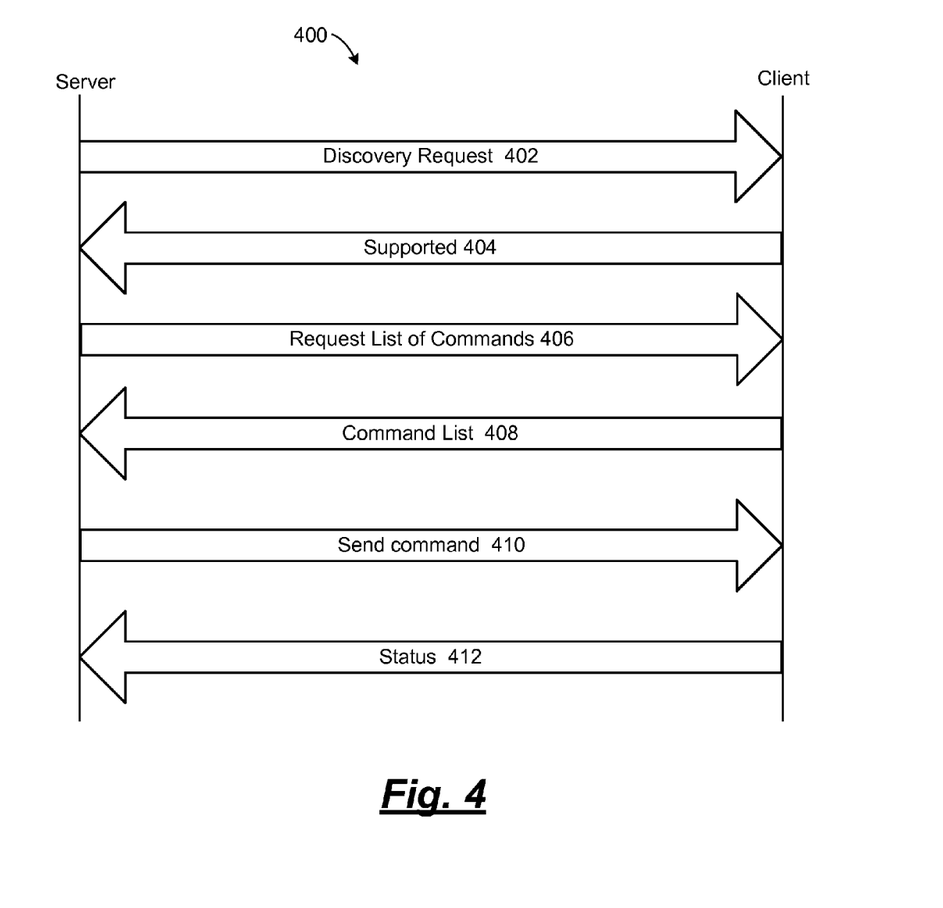
FIG. 4 is another diagram illustrating aspects of message flows between the client media device and the server.

FIG. 4 is another diagram illustrating aspects of message flows 400 between a server and a client (e.g., digital media device 150). A first message from the server (e.g., Server 130) to the client (e.g., digital media device 150) may be a discovery request 402. The requester makes an "#info" query to the responder. The client may then respond with a message 404 that remote commands are supported. If supported, the server may then send a message 406 to request the list of supported commands from the client. The client responds with a list of supported commands in a response message 408. The list of supported commands may be used by the server to populate a menu, a dialog of buttons, or whatever is appropriate for the interface. The responder is not required to send the same list of commands to all requesters.

To execute a remote command, the server sends the command in a message 410. Each command is identified by its 'node' attribute, which matches the 'node' attribute from the service discovery <item/> element. The client may respond with a status and/or result 412 of the execution of the command. The status may be, e.g., "completed," "executing," or "canceled" and the result is dependent on the command executed.

Figure 5:
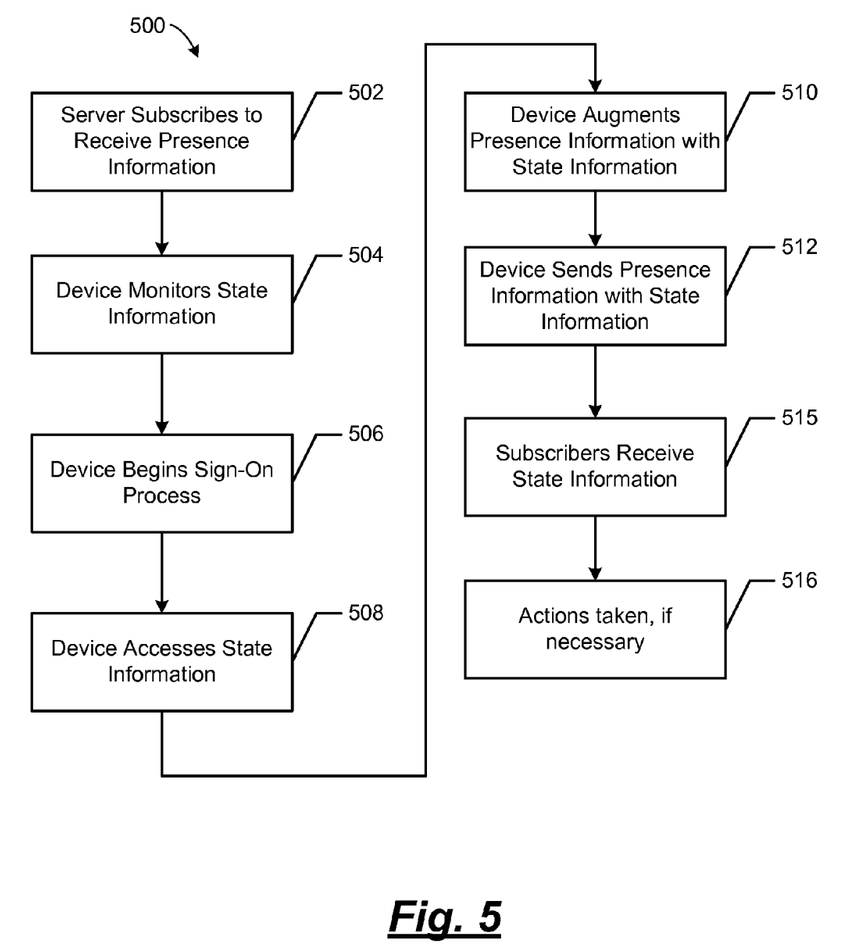
FIG. 5 is an exemplary operation flow diagram of processes performed to augment presence information with device state information as part of a sign-on message.

FIG. 5 is an exemplary operation flow diagram of processes 500 performed to augment presence information with device state information as part of a sign-on message. At 502, a server may optionally register to subscribe to presence information of one or more client devices. The subscriber may be the server 130 may be a diagnostic server in the network 120. The presence information may be that from the digital media device 150 or any other component communication over the network 120.

At 504, a device monitors its state information. The device may be, for example, the digital media device 150 monitoring its health (errors, faults, utilization, etc.), application status and versioning. It is noted the processes performed at 502 and 504 may be performed concurrently or in a different order than shown in FIG. 5 (i.e., 504 may precede 502).

At 506, the device begins a sign-on process. For example, the digital media device 150 may begin a communication session with the server 130 in accordance with the message flows shown above. In a managed environment, it may be that the digital media device 150 first authenticates with the network 120 in order to perform certain functions or to access or receive certain information and programming. A sign-on process may include an authentication of the digital media device 150 at the server 130 to enable the digital media device 150 access services on the node 122 or network components.

At 508, the device accesses the state information. For example, the device state information may be stored in the system memory 229. In a managed environment, the server 130 (e.g., diagnostic server) may be interested in the state information as part of managing the endpoints (e.g., the digital media devices).

At 510, the device augments presence information with state information retrieved at 508. As part of the message flows illustrated in FIG. 3, the digital media device 150 may augment the presence information, which is part of an XML stanza, with the state information gathered by the digital media device 150 at 504 and retrieved at 508. The presence and state information may be communicated to the server 130 at 512.

At 514, the subscribers receive the state information. For example, the server 130, as a subscriber, would receive state information associated with the digital media device 150 from, e.g., the node 122 or another server 130 in real-time or near real-time based on the digital media device 150 providing the state information at 512.

At 516, actions may be taken, if necessary. For example if the server 130 is a diagnostics agent and the state information sent by the digital media device 150 indicates a problem, an action may be taken to correct the problem identified by the state information. For example, the digital media device may be remotely commanded to perform an action or a service provider may contact a subscriber to inform the subscriber of the problem identified by the digital media device 150.

Thus, in accordance with the processes 500, when the digital media device 150 updates its presence (e.g., by going into stand-by, by powering on, etc.) and or authenticates with the network (e.g., when accessing services), the network receives real-time state information from the digital media device 150, rather than waiting for a next polling period.

Figure 6:
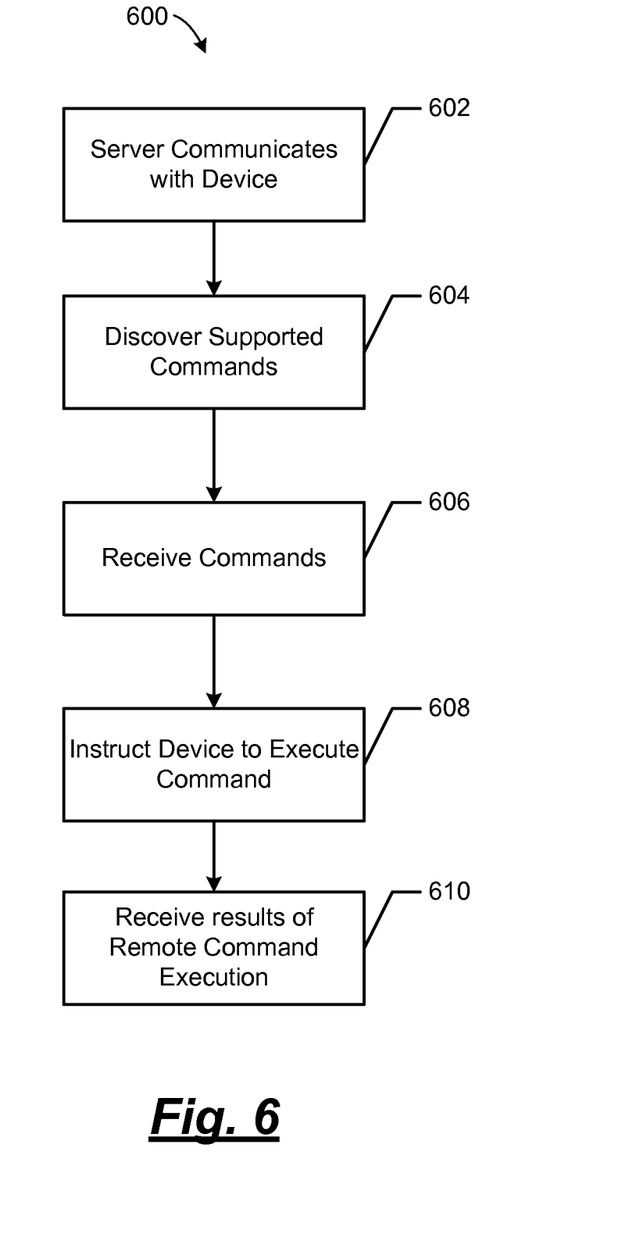
FIG. 6 is an example flow diagram of processes performed to execute a remote command.

FIG. 6 is an example flow diagram of processes 600 performed to execute a remote command. The exemplary processes may be performed using aspects of XEP-0050: Ad-Hoc Commands (published by the XMPP Standards Foundation). At 602, the server communicates with the device. For example, the server 130 may be a diagnostics server in a managed network that communicates with the digital media device 150 in the managed network.

At 604, supported commands are discovered. For example, it may be that the server 130 has already determined that the digital media device 150 supports remote commands. The server 130 may send a request to the digital media device 150 to ascertain a list of supported commands. At 606, the supported commands are received. The server 130 receives a list of supported commands from the digital media device 150 to populate a table, etc. with a list of commands. As such, the server 130 will know what commands are supported by the digital media device 150 when attempting to execute a remote command on the device.

At 608, the device is instructed to execute a remote command. The server 130, using the description of the remote command structure in XEP-0050, may instruct the digital media device 150 to perform one or more operations. At 610, the server receives the results of the remote command execution. For example, the digital media device 150 or other device may send the results of the command execution to the server 130. From those results, the server 130 may send an additional instruction, as described in 608 above.

Thus, in accordance with the processes 600, managed devices within a managed or unmanaged network can be remotely commanded and controlled using, e.g., XMPP to traverse any obstacles, such as an unmanaged NAT device, Firewall, router, gateway, a private network, etc.

In the implementations above, the functions of the server 130 and the digital media device 150 can be embodied in any computer-readable medium for use by or in connection with an instruction execution system, apparatus, or device. Such instruction execution systems include any computer-based system, processor-containing system, or other system that can fetch and execute the instructions from the instruction execution system. In the context of this disclosure, a "computer-readable medium" can be any means that can contain, store, communicate, propagate, or transport the program for use by, or in connection with, the instruction execution system. The computer readable medium can be, for example but not limited to, a system or that is based on electronic, magnetic, optical, electromagnetic, infrared, or semiconductor technology.

Specific examples of a computer-readable medium using electronic technology would include (but are not limited to) the following: random access memory (RAM); read-only memory (ROM); and erasable programmable read-only memory (EPROM or Flash memory). A specific example using magnetic technology includes (but is not limited to) a portable computer diskette. Specific examples using optical technology include (but are not limited to) compact disk (CD) and digital video disk (DVD).

Any software components illustrated herein are abstractions chosen to illustrate how functionality is partitioned among components. Other divisions of functionality are also possible, and these other possibilities are intended to be within the scope of this disclosure. Furthermore, to the extent that software components are described in terms of specific data structures (e.g., arrays, lists, flags, pointers, collections, etc.), other data structures providing similar functionality can be used instead.

Any software components included herein are described in terms of code and data, rather than with reference to a particular hardware device executing that code. Furthermore, to the extent that system and methods are described in object-oriented terms, there is no requirement that the systems and methods be implemented in an object-oriented language. Rather, the systems and methods can be implemented in any programming language, and executed on any hardware platform.

Any software components referred to herein include executable code that is packaged, for example, as a standalone executable file, a library, a shared library, a loadable module, a driver, or an assembly, as well as interpreted code that is packaged, for example, as a class. In general, the components used by the systems and methods of reducing media stream delay are described herein in terms of code and data, rather than with reference to a particular hardware device executing that code. Furthermore, the systems and methods can be implemented in any programming language, and executed on any hardware platform.

The flow charts, messaging diagrams, state diagrams, and/or data flow diagrams herein provide examples of the operation of systems and methods. Blocks in these diagrams represent procedures, functions, modules, or portions of code which include one or more executable instructions for implementing logical functions or steps in the process. Alternate implementations are also included within the scope of the disclosure. In these alternate implementations, functions may be executed out of order from that shown or discussed, including substantially concurrently or in reverse order, depending on the functionality involved.

The foregoing description has been presented for purposes of illustration and description. It is not intended to be exhaustive or to limit the disclosure to the precise forms disclosed. Obvious modifications or variations are possible in light of the above teachings. The implementations discussed, however, were chosen and described to illustrate the principles of the disclosure and its practical application to thereby enable one of ordinary skill in the art to utilize the disclosure in various implementations and with various modifications as are suited to the particular use contemplated. All such modifications and variation are within the scope of the disclosure as determined by the appended claims when interpreted in accordance with the breadth to which they are fairly and legally entitled.

What is claimed is:

1. A method of providing near real-time state information to a network component, comprising:
    monitoring state information in a digital media device, the state information including initial state information and subsequent state information, wherein the digital media device is connected to a network through an unmanaged network component;
    authenticating the digital media device;
    ascertaining the state information of the digital media device;
    communicating initial presence information augmented with the initial state information in an initial message as part of an authentication process; and
    communicating subsequent presence information augmented with the subsequent state information in a subsequent message in response to a change in presence information, wherein the initial and subsequent presence and state information are sent over the network using an Extensible Messaging and Presence Protocol (XMPP) extension.

2. The method of claim 1, further comprising communicating the presence information and state information in an XML stanza.

3. The method of claim 1, further comprising taking corrective actions in near real-time based on the state information.

4. The method of claim 3, further comprising remotely commanding the digital media device to perform an action.

5. The method of claim 1, wherein the state information is published to a node and wherein the state information is provided to a subscriber.

6. The method of claim 5, wherein the subscriber is a network diagnostic component.

7. A method of providing diagnostics and troubleshooting to a managed digital media device, comprising:
    authenticating the managed digital media device, wherein the managed digital media device is connected to a network through an unmanaged network component;
    communicating presence information augmented with state information of the managed digital media device in a message in response to a change in presence information;
    ascertaining if a condition exists in the managed digital media device;
    sending a discovery request to the managed digital media device;
    discovering commands supported by the managed digital media device;

sending a remote command to the managed digital media device for execution, wherein the remote command is sent over the network using an Extensible Messaging and Presence Protocol (XMPP) extension; and receiving a status message and results from the managed digital media device.

8. The method of claim 7, wherein the state information of the managed digital media device is communicated in near real-time by the managed digital media device.

9. The method of claim 8, wherein the state information is provided to a node and wherein the state information is published to a subscriber that includes a diagnostic component.

10. The method of claim 9, wherein the unmanaged network component is one of a NAT device, a Firewall, a router and a gateway.

* * * * *